(12) United States Patent
Al Sayeed et al.

(10) Patent No.: US 9,986,317 B1
(45) Date of Patent: May 29, 2018

(54) SYSTEMS AND METHODS MODELING OPTICAL SOURCES IN OPTICAL SPECTRUM CONTROLLERS FOR CONTROL THEREOF

(71) Applicant: Ciena Corporation, Hanover, MD (US)

(72) Inventors: Choudhury A. Al Sayeed, Sittsville (CA); Dave C. Bownass, Ottawa (CA); Edward Chen, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days. days.

(21) Appl. No.: 15/363,255

(22) Filed: Nov. 29, 2016

(51) Int. Cl.
*H04B 10/27* (2013.01)
*H04Q 11/00* (2006.01)

(52) U.S. Cl.
CPC . *H04Q 11/0062* (2013.01); *H04Q 2011/0073* (2013.01); *H04Q 2011/0086* (2013.01); *H04Q 2011/0088* (2013.01)

(58) Field of Classification Search
CPC ... H04B 10/564; H04B 10/27; H04Q 11/0062
See application file for complete search history.

(56) References Cited

U.S. PATENT DOCUMENTS

| | | | |
|---|---|---|---|
| 5,442,544 A | 8/1995 | Jelinek | |
| 6,654,561 B1 * | 11/2003 | Terahara | H04B 10/07953 398/25 |
| 7,444,078 B1 | 10/2008 | Stango et al. | |
| 7,826,748 B2 | 11/2010 | Yang et al. | |
| 7,873,274 B2 | 1/2011 | Collings et al. | |
| 7,983,560 B2 | 7/2011 | Maki et al. | |
| 8,077,384 B2 | 12/2011 | Mori | |
| 8,095,008 B2 | 1/2012 | Collings et al. | |
| 8,135,280 B2 | 3/2012 | Zong et al. | |
| 8,160,446 B2 | 4/2012 | Collings et al. | |
| 9,276,696 B2 | 3/2016 | Al Sayeed et al. | |
| 9,344,191 B2 | 5/2016 | Al Sayeed et al. | |
| 2002/0114066 A1 * | 8/2002 | Nakaji | H01S 3/06754 359/341.41 |
| 2003/0058497 A1 | 3/2003 | Park et al. | |
| 2006/0018658 A1 | 1/2006 | Mori | |
| 2007/0269215 A1 | 11/2007 | Sugaya | |

(Continued)

OTHER PUBLICATIONS

Aggarwal et al., A Self-Tuning Analog Proportional-Integral-Derivative (PI D) Controller, 2006, IEEE.
PID Theory Explained, Mar. 29, 2011, pp. 1-4.

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

Systems and methods for modeling non-visible optical sources in a spectrum controller for control thereof include receiving channel routing information and signal characteristics for the non-visible channels separately from visible channels, wherein the visible channels are formed by optical transceivers communicatively coupled to the spectrum controller and the non-visible channels are formed by optical transceivers without communication to the spectrum controller; utilizing a combination of the channel routing information and signal characteristics for both the visible channels and the non-visible channels as input to the spectrum controller; performing control of optical spectrum based on the input; and providing output adjustments based on the control.

20 Claims, 8 Drawing Sheets

(56) References Cited

U.S. PATENT DOCUMENTS

| | | |
|---|---|---|
| 2008/0285973 A1 | 11/2008 | Uchiyama et al. |
| 2009/0116837 A1 | 5/2009 | Boertjes et al. |
| 2010/0091355 A1 | 4/2010 | Ota |
| 2010/0104276 A1 | 4/2010 | Komaki |
| 2010/0158532 A1* | 6/2010 | Goto ................ H04B 10/07955 398/81 |
| 2010/0202777 A1 | 8/2010 | Liu et al. |
| 2010/0221004 A1 | 9/2010 | Haslam et al. |
| 2011/0176802 A1 | 7/2011 | Callan |
| 2011/0200324 A1 | 8/2011 | Boertjes et al. |
| 2011/0222846 A1 | 9/2011 | Boertjes et al. |
| 2011/0222851 A1 | 9/2011 | Berg |
| 2011/0222862 A1 | 9/2011 | Boertjes et al. |
| 2011/0268442 A1 | 11/2011 | Boertjes et al. |
| 2011/0274425 A1 | 11/2011 | Grobe |
| 2013/0336658 A1* | 12/2013 | Xia .................... H04J 14/0204 398/83 |
| 2016/0315729 A1* | 10/2016 | Tsuzuki ............. H04J 14/0221 |

* cited by examiner

SYSTEMS AND METHODS MODELING OPTICAL SOURCES IN OPTICAL SPECTRUM CONTROLLERS FOR CONTROL THEREOF

FIELD OF THE DISCLOSURE

The present disclosure generally relates to optical networking systems and methods. More particularly, the present disclosure relates to systems and methods modeling optical sources (such as foreign or alien channels, bulk channel sources, etc.) in optical spectrum controllers for control thereof.

BACKGROUND OF THE DISCLOSURE

In optical networks with Reconfigurable Optical Add/Drop Multiplexers (ROADMs), spectrum controllers are used to control signal characteristics, attenuation, and gain of optical amplifiers. The spectrum controllers take signal characteristics, perform analysis, and determine settings such as attenuator settings, gain adjustments, and the like. To date, spectrum controllers are vendor-specific and limited to operation on systems with integration, i.e., the same vendor. That is, the input signal characteristics are monitored, and the output settings are implemented, all on the same vendor's equipment. For a specific vendor's systems and methods, there is no ability to implement spectrum control of third-party signals or channels formed by other equipment. In an optical network, a channel is defined as an optical service traversing from a source node to a destination node, while an optical signal is referred as the optical channel payload. Third-party signals are also known as foreign or alien signals and channels are formed by third-party vendor equipment that operates in an optical network. Also, in some embodiments, bulk channels are added to an optical network for full-fill operation, such as to test a field system to ensure operation according to expectations. In these cases, conventional optical spectrum controllers do not have visibility of these channels. Thus, there is no ability for spectrum controllers to operate with these channels.

BRIEF SUMMARY OF THE DISCLOSURE

In an exemplary embodiment, a method for modeling non-visible optical sources generating optical signals coming to the input of a spectrum controller in a single fiber for control thereof in an optical network includes receiving channel routing information and signal characteristics for the non-visible channels separately from visible channels, wherein the visible channels are formed by one or more first optical transceivers communicatively coupled to the spectrum controller and the non-visible channels are formed by one or more second optical transceivers without communication to the spectrum controller; utilizing a combination of the channel routing information and signal characteristics for both the visible channels and the non-visible channels as input to the spectrum controller; performing control of optical spectrum based on the input; and providing output adjustments based on the control. The output adjustments can include i) output power adjustments of each of the one or more first optical transceivers and the one or more second optical transceivers, and ii) gain adjustments to one or more amplifiers. The output adjustments can be automatically implemented in the one or more first optical transceivers and provided as recommendations for manual implementation in the one or more second optical transceivers. The second optical transceivers can include any of i) one or more bulk channel sources for channel loading and ii) one or more third-party optical transceivers which provide foreign channels supported in the optical network.

The channel routing information can include a source port at a channel access point and a destination degree; and wherein the signal characteristics can include a plurality of control or center frequency, spectral shape, required bandwidth, spectral spacing compared to neighboring signals, total signal power or power spectral density at the source port, target launch power, modulation, and signal-to-noise ratio bias preferences compared to neighboring signals. The channel routing information and signal characteristics for the non-visible channels can be modeled as a virtual colorless multiplexer/demultiplexer with N ports, N being an integer greater than or equal to 1, and with associated insertion losses on each port to model multiplexing/demultiplexing structure, wherein each port can model any signal from any spectral location. The channel routing information and signal characteristics for the non-visible channels can include modeled as an array of logical source and sink mappings. For the non-visible channels, the signal characteristics for one port can be independent of the signal characteristics of another port. For the non-visible channels, fiber loss from an associated source of each of the non-visible channels can be modeled as insertion loss into a virtual port for modeling the non-visible channels. Each of the non-visible channels can be mapped as a logical cross-connect facility independent of other of the non-visible channels. The spectrum controller can operate on an optical section with the visible channels and the non-visible channels.

In another exemplary embodiment, a spectrum controller adapted to model non-visible optical sources for control thereof in an optical network includes a processor; a communications interface communicatively coupled to the processor; and memory storing instructions that, when executed, cause the processor to receive, via the communications interface, channel routing information and signal characteristics for the non-visible channels separately from visible channels, wherein the visible channels are formed by optical transceivers communicatively coupled to the spectrum controller and the non-visible channels are formed by optical transceivers without communication to the spectrum controller, utilize a combination of the channel routing information and signal characteristics for both the visible channels and the non-visible channels as input to the spectrum controller, perform control of optical spectrum based on the input, and provide output adjustments based on the control. The output adjustments can include i) output power adjustments of each of the one or more first optical transceivers and the one or more second optical transceivers, and ii) gain adjustments to one or more amplifiers.

The output adjustments can be automatically implemented in the one or more first optical transceivers and provided as recommendations for manual implementation in the one or more second optical transceivers. The second optical transceivers can include any of i) one or more bulk channel sources for channel loading and ii) one or more third-party optical transceivers which provide foreign channels supported in the optical network. The channel routing information can include a source port at a channel access point and a destination degree; and wherein the signal characteristics can include a plurality of control or center frequency, spectral shape, required bandwidth or spectral spacing compared to neighboring signals, total signal power or power spectral density at the source port, target launch power, modulation, and signal-to-noise ratio bias preferences compared to neighboring signals. The channel routing information and signal characteristics for the non-visible channels can be modeled as a virtual colorless multiplexer/demultiplexer with N ports, N being an integer greater than or equal to 1, and with associated insertion losses on each port to model multiplexing structure. The channel routing information and signal characteristics for the non-visible channels can be modeled as an array of logical source and sink mappings. For the non-visible channels the signal characteristics for one port can be independent of the signal characteristics of another port, and fiber loss from an associated source of each of the non-visible channels can be modeled as insertion loss into a virtual port for modeling the non-visible channels.

In a further exemplary embodiment, an optical network includes a plurality of interconnected Optical Add/Drop Multiplexer (OADM) nodes; a plurality of links interconnecting the OADM nodes; and a spectrum controller adapted to receive channel routing information and signal characteristics for the non-visible channels separately from visible channels, wherein the visible channels are formed by optical transceivers communicatively coupled to the spectrum controller and the non-visible channels are formed by optical transceivers without communication to the spectrum controller; utilize a combination of the channel routing information and signal characteristics for both the visible channels and the non-visible channels as input to the spectrum controller; perform control of optical spectrum based on the input; and provide output adjustments based on the control.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods modeling optical sources (such as foreign or alien channels, bulk channel sources, etc.) in optical spectrum controllers for control thereof. The systems and methods include logical modeling of an array of one or more optical signals coming from a bulk source, third-party transceiver, etc. on a single fiber at a channel access point of an Optical Add/Drop Multiplexer (OADM) node into photonic/spectrum controller legible parameters. With the logical modeling, the spectrum controller can perform operations on both visible channels (i.e., channels capable of control by the spectrum controller) and non-visible channels (i.e., bulk channel sources, foreign or alien channels, etc.). With the non-visible channels, the spectrum controller can provide suggestions for appropriate settings, allowing users to remotely manage capacity changes (add/delete) from the non-visible sources in a controlled way while keeping the line systems optimized by automated photonic/spectrum controllers.

Exemplary Optical Network

Figure 1:
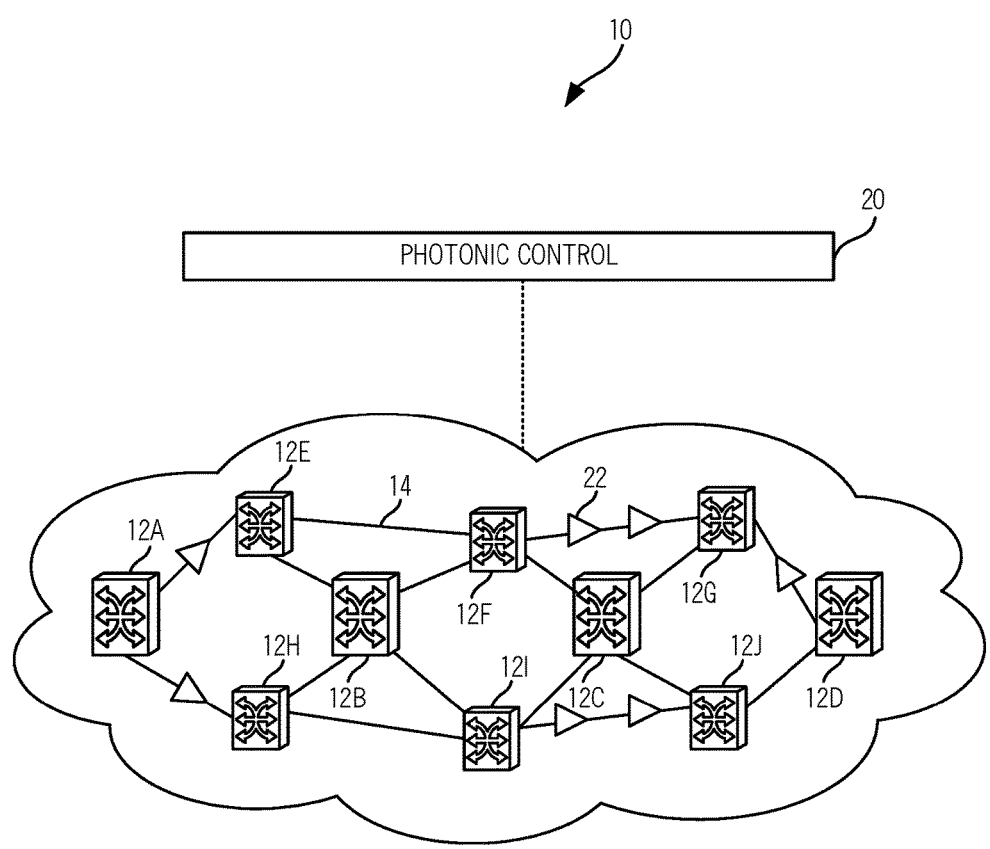
FIG. 1 is a network diagram of an exemplary optical network with interconnected ROADM nodes.

Referring to FIG. 1, in an exemplary embodiment, a network diagram illustrates an exemplary optical network 10 with interconnected ROADM nodes 12 (labeled as 12A-12J). The ROADM nodes 12 are interconnected by a plurality of links 14. The ROADM nodes 12 provide the photonic layer (e.g., Layer 0) and various functionality associated therewith (e.g., multiplexing, amplification, optical routing, wavelength conversion/regeneration, local add/drop, wavelength switching, etc.) including photonic control 20. The photonic layer and the photonic control operating thereon can also include intermediate amplifiers 22 and/or regenerators (which are omitted for illustration purposes) on the links 14. The optical network 10 is illustrated, for example, as an interconnected mesh network, and those of ordinary skill in the art will recognize the network 10 can include other architectures, with ROADM nodes 12 or with fewer n ROADM nodes 12, with additional amplifiers 22, with additional network elements and hardware, etc. Those of ordinary skill in the art will recognize the systems and methods described herein can be used in any optical networking scenario for the optical network 10, and the optical network 10 is merely presented for illustration purposes.

The ROADM nodes 12 are connected with one another optically over the links 14. ROADM nodes 12 can be network elements which include a plurality of ingress and egress ports forming the links 14. As described herein, a port may be formed by a transceiver module or optical modem to provide an optical connection between the ROADM nodes 12. The optical network 10 can include the photonic control 20 which can be viewed as a control algorithm/loop for managing channels from a physical perspective at Layer 0. As described herein, the spectrum controllers (also referred to as photonic controllers) are implemented in the photonic control 20. In one aspect, the photonic control 20 is configured to add/remove channels from the links in a controlled manner to minimize impacts to existing, in-service channels. For example, the photonic control 20 can adjust modem launch powers, optical amplifier gain, variable optical attenuator (VOA) settings, wavelength selective switch (WSS) parameters, etc. The photonic control 20 can also be adapted to perform network optimization on the links 14. This optimization can also include re-optimization where appropriate. In an exemplary embodiment, the photonic control 20 can adjust the modulation format, baud rate, frequency, wavelength, spectral width, etc.

Spectrum Controllers

Figure 2:
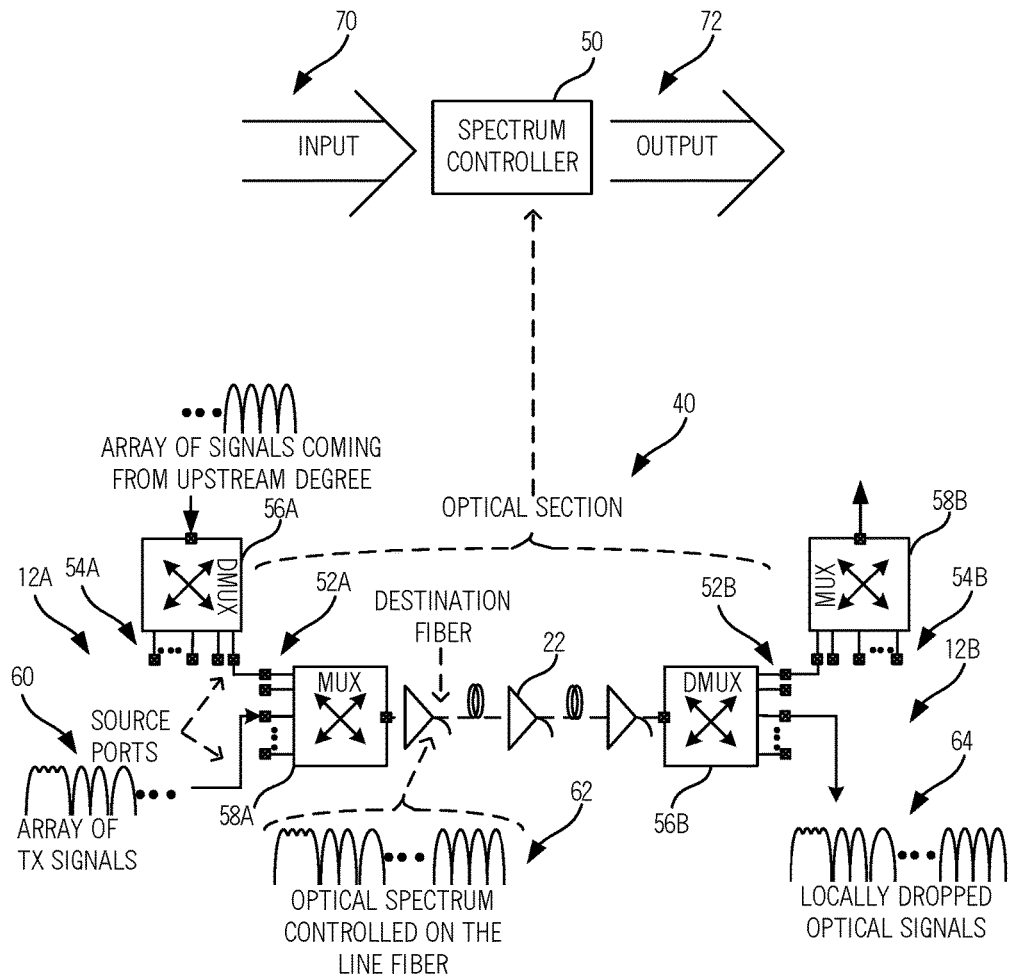
FIG. 2 is a network diagram of an optical section with an associated spectrum controller operating thereon.

Referring to FIG. 2, in an exemplary embodiment, a network diagram illustrates an optical section 40 with an associated spectrum controller 50 operating thereon. Again, the spectrum controller 50 is part of the photonic control 20. In an exemplary embodiment, the spectrum controller 50 can operate between ROADM nodes 12 on an optical section. An optical section 40 is a link 14 between two ROADM nodes 12A, 12B with zero or more intermediate amplifiers 22, including pre, post, and in-line amplifiers. The optical section 40 is bookended between two channel access points, i.e., the ROADM nodes 12A, 12B. Thus the optical capacity in the optical section 40 is the same on all links 14 in the optical section 40 (one OADM to the next OADM). Note, the spectrum controller 50 could operate across multiple optical sections 40 in some embodiments, and the limit of a single optical section 40 for each spectrum controller 50 is one exemplary implementation. In an exemplary embodiment, the spectrum controller 50 can perform some control loop feedback mechanism, such as a proportional-integral-derivative controller (PID controller) or variants thereof.

In this example, the ROADM nodes 12A, 12B are illustrated with two degrees 52, 54 (labeled as degrees 52A, 54A for the ROADM node 12A and degrees 52B, 54B for the ROADM node 12B) each with the degree 52 forming the optical section 40 and the degree 54 facing another optical section (not shown). Also, for illustration purposes, the optical section 40 and the degrees 52, 54 are shown in one direction only, but those of ordinary skill in the art will recognize an actual implementation can include complementary equipment to form a bidirectional link. The degrees 54A, 52B are formed by demultiplexers 56 (labeled as demultiplexer 56A at the ROADM node 12A and demultiplexer 56B at the ROADM node 12B), such as Wavelength Selective Switches (WSSs) or the like. The degrees 52A, 54B are formed by multiplexers 58 (labeled as multiplexer 58A at the ROADM node 12A and multiplexer 58B at the ROADM node 12B), such as WSSs or the like.

From right to left, the degree 52A receives zero or more locally added channels 60 on source ports of the multiplexer 58A and zero or more channels from upstream ROADM nodes 12 (not shown) via the degree 54A. From a terminology perspective, the channels 60 are said to be local add/drop channels whereas the channels from the degrees 54A are said to be express or pass-through channels (from the perspective of the ROADM node 12A). The optical section 40 includes optical spectrum 62 on the line fiber, the links 14. The optical spectrum 62 has channels from the local add/drop channels and/or the pass-through channels. At the ROADM node 12B, the demultiplexer 56B either drops channels 64 which are referred to as locally dropped channels and/or expresses pass-through channels to the degree 54B.

The spectrum controller 50 can be implemented by a processing device, server, controller, etc. to receive input 70, perform optimization and provide output 72 related to the appropriate settings of the various components. The input 70 can include optical spectrum at the start of the optical section 40, source ports of each signal in the optical spectrum, destination fiber degree of each signal in the optical spectrum, and signal characteristics of each signal. The signal characteristics can include, for example, control frequency or center frequency of the signal, the signal's spectral shape, required bandwidth or spectral spacing compared to neighboring signals, total signal power or power spectral density of the incoming signal at the source port, target launch power for each signal at the destination fiber span, each signal's modulation characteristics, and Signal-to-Noise Ratio (SNR) bias preferences compared to neighboring signals.

With the input 70, the spectrum controller 50 implements various control algorithms to determine the output 72. The output 72 can include per signal actuator settings such as attenuation adjustments, gain adjustments for optical amplifiers 22 per fiber span or for amplifier blocks associated with add/drop structures (if any), and the like.

As described herein, the spectrum controller 50 is conventionally limited to operate on channels it has visibility of, namely channels formed by optical transceivers which are compliant with the spectrum controller 50. Visible channels are ones where the optical transceivers are designed to work with the spectrum controller 50. Further, there are two exemplary situations where non-visible channels can be part of the optical spectrum 62, namely channels added by bulk sources or by third-party transceivers. Thus, the spectrum controller 50 has no ability to recognize the inputs 70 related to these non-visible channels and to provide the outputs 72 to adjust actuators associated with these non-visible channels. Again, as described herein, visible and non-visible describe integration or non-integration with the spectrum controller 50. As described herein, the systems and methods provide constructs to make one or more externally supplied optical signals, via non-visible sources, visible to the spectrum controller 50 for management thereof.

Bulk Optical Sources

Figure 3:
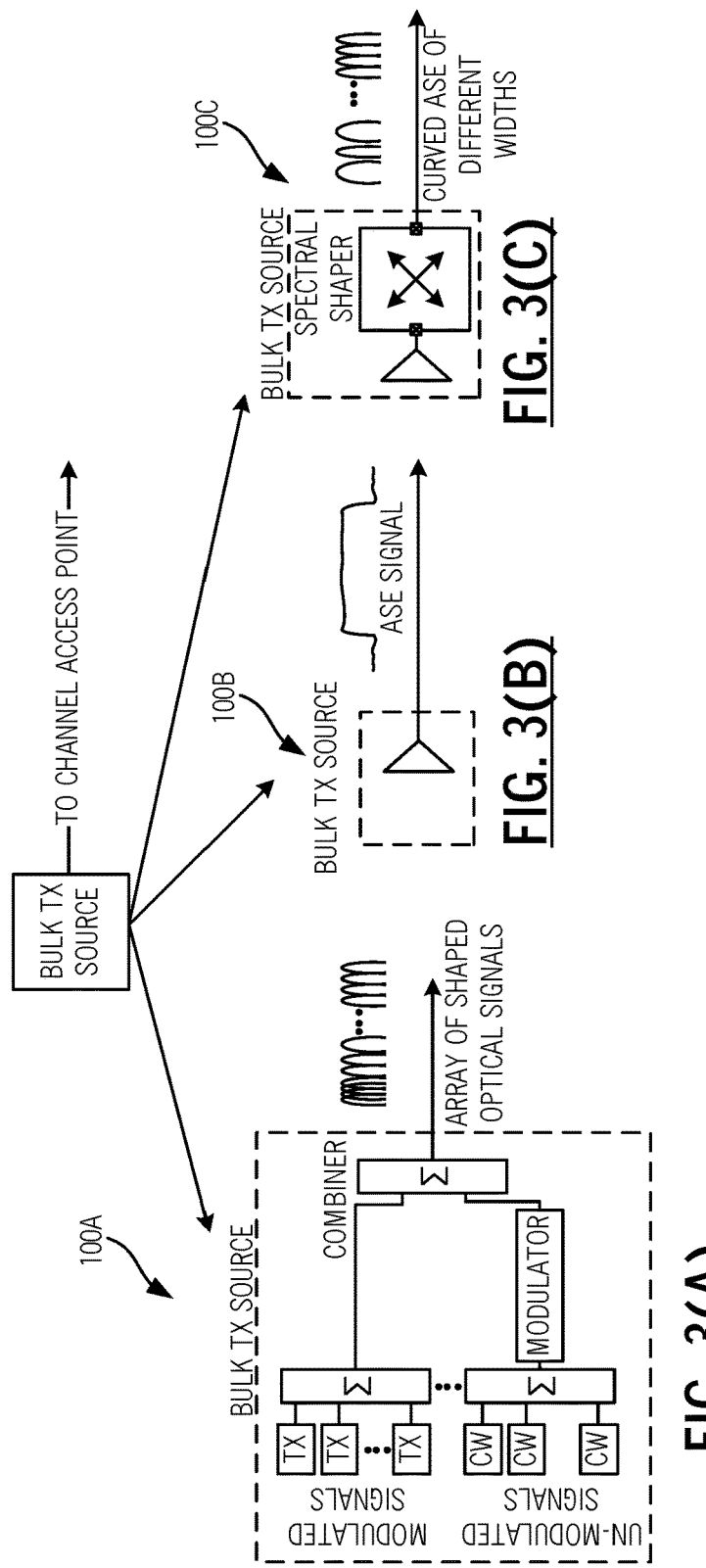
FIGS. 3(A), 3(B), and 3(C) are block diagrams of various examples of bulk optical sources.

Referring to FIGS. 3(A), 3(B), and 3(C), in an exemplary embodiment, block diagrams illustrate various examples of bulk optical sources 100 (labeled as 100A, 100B, 100C). As described herein, one exemplary non-visible channel to the spectrum controller 50 can be via a bulk optical source 100. When the optical network 10 is first installed in the field, before the optical network 10 is put into full-scale operation for traffic carrying services, the optical network 10 is typically tested to confirm if the installed photonic component and fibers are behaving per expectations. A series of test cases is typically run called network acceptance test cases. One of the prime concerns network operators have with the initial network is the low number of traffic carrying services that will be deployed with enough potential margin due to less number of neighboring interfering channels, whether those services will survive when the optical network 10 will be carrying more services with full-fill spectrum. With the introduction of flexible grid network topology, the situation has become more complex, where the network user not only needs to confirm the available system margin with full-fill spectrum in gridded space but also needs to confirm the available margin in flexible spectrum space, where optical channels can be more closely spaced to improve the number of optical channels on the fiber.

One approach used for achieving full-fill spectrum initially for testing is bulk optical sources 100, where channels are added to the system by manually controlling spectral selective switches and actuators. However, with this approach, the key problem is that the automated photonic control 20 applications via the optical spectrum 50 that typically run in optical sections 40 to optimize overall performance for controlled channels relative to the spectrum, fail in these conditions due to unusual presence of a large amount of optical signals via non-visible (to the spectrum controller 50) channels from the bulk optical sources 100.

Therefore, conventionally, in such field acceptance test cases, photonic control 20 applications are typically turned off, while the spectrum is filled with optical signals from the bulk optical sources 100 along with few test channels, whose optical performance is manually monitored. As a result, the full advantage of running control algorithms such as the spectrum controller 50 for obtaining the best performance cannot be realized.

At low fill, when a new optical network 10 is built, knowing the system margin in full-fill channel loading condition is important to define the adaptability of the optical network 10 for future traffic growth. The system margin is typically estimated in an offline simulation, considering full-fill channel loading conditions, and in order to ensure the planned traffic will survive in full-fill state, several provisioning parameters are set (such as per channel target launch power to line fiber or target power spectral density to the fiber) to achieve maximum available margin with minimal non-linear penalty. However, offline simulations are estimated based on expected/designed network properties (such as fiber length, type, loss per kilometer, etc.) that can be off from the actual deployment. In the field, during initial system installation time frame, when only a few traffic channels are added to the optical network 10 (primarily due to low traffic demand initially and to reduce initial capital expenditure), there is not much option to verify the offline simulation estimated system margin in real deployed conditions considering system uncertainty and fiber variability. One option to ensure that the system is behaving as planned to be and the initially deployed traffic will survive in full-fill channel loading condition is to load the rest of the spectrum by adding signals either from individual transmitters (Tx's) or from bulk optical sources 100.

Examples of such bulk optical sources 100 are highlighted in FIGS. 3(A), 3(B), and 3(C), where the bulk source 100A can include modulated signals or unmodulated continuous-wave (CW) lasers (FIG. 3(A)), or can be generated using an Amplified Spontaneous Emission (ASE) generator (FIG. 3(B)), or the generated ASE can be further curved out using a spectral shaper to generate an array of optical signals of different spectral bandwidths, spectral spacing, frequencies, and optical power values (FIG. 3(C)).

With the bulk optical sources 100, to emulate full-fill channel loading conditions along with the test channel or initially deployed traffic channels, a single fiber carrying an array of optical signals is brought to the channel access point at optical add/drop multiplexers (OADM), and signals are then added to the line system by manually adjusting per channel actuators. However, the optical network 10, running spectrum controllers 50 at or connected to the OADM nodes and trying to maintain launch power targets and SNR equalization over the optical spectrum 62, are more complicated than manual adjustments.

To provide proper control, whether it is one-time or close-loop actuator adjustments, the spectrum controllers 50 need to know signals' spectral location, their bandwidths, and estimated power values at multiplexer (mux) input and so on.

In the systems and methods described herein, two specific techniques are introduced to logically map the array of optical signals coming into a single fiber at the channel access point into spectrum controller 50 legible parameters that allows the spectrum controller 50 not only to maintain a close loop control on them in order to maintain launch power targets and SNR equalization, but also allows to add/delete those array of signals from the optical network 10 and hence, enabling remote channel turn up in a controlled fashion, and alleviating any manual user intervention for actuator settings.

Optical Transceivers

In addition to the bulk optical sources 100, another type of non-visible channel can be formed by third-party optical transceivers or modems, referred to as alien or foreign channels (from the perspective of the optical network 10). As optical networks 10 evolve, it is expected that optical line systems will support third-party channels, including through the spectrum controller 50. The same specific techniques for logically mapping the array of optical signals at the channel access point for the bulk optical sources 100 can be used with the third-party transceiver. Generally, an optical transceiver is associated with the optical signal which is the result of modulating an electrical signal onto an optical carrier. That electrical signal may have a single carrier such as with a single Time Division Multiplexing (TDM) stream of Quadrature Phase Shift Keying (QPSK) symbols, Quadrature Amplitude Modulation (QAM), Higher order modulation formats, a plurality of carriers such as with Frequency-Division Multiplexing (FDM), or a very large number of carriers such as with Orthogonal Frequency-Division Multiplexing (OFDM). Also, the optical transceiver can use polarization multiplexing with any of the foregoing modulation formats. Any type of modulation scheme is contemplated. The optical transceiver can include coherent transmitters which can provide spectral shaping allowing for more efficient spectrum use and flexible grid placement. Also, the coherent transmitters support selectable modulation formats allowing for optimal matching of the formats spectral efficiency to the given link condition. From the perspective of the spectrum controller 50, the optical transceiver has a given launch power, control frequency or center frequency, spectral shape, spectral spacing, total signal power or power spectral density, modulation, and SNR bias.

Spectrum Controller Control of Non-Visible Channels and Visible Channels

Figure 4:
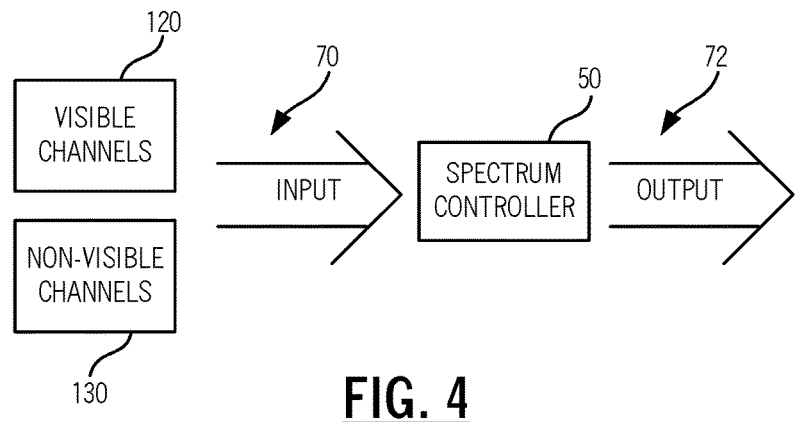
FIG. 4 is a diagram of the spectrum controller for control of both visible channels and non-visible channels.

Referring to FIG. 4, in an exemplary embodiment, a diagram illustrates the spectrum controller 50 for control of both visible channels 120 and non-visible channels 130. The visible channels 120 can be formed by optical transceivers that are integrated with or communicatively coupled to the spectrum controller 50. For example, in a single vendor implementation, the spectrum controller 50 is configured to receive relevant data related to the visible channels 120 such as through a Network Management System (NMS), Element Management System (EMS), Application Programming Interface (API), Northbound Interface, etc. That is, the spectrum controller 50 is configured to operate on the optical transceivers associated with the visible channels 120. The non-visible channels 130 can include the bulk optical sources 100, third-party optical transceivers forming foreign/alien channels, etc.

The relevant data can include, for example, channel routing information of each visible channel 120 (source port, destination port, ROADM degrees) and signal characteristics of each visible channel 120. Again, the signal characteristics can include control frequency or center frequency of the signal, signal's spectral shape, required bandwidth or spectral spacing compared to neighboring signals, total signal power or power spectral density of the incoming signal at the source port, target launch power for each signal at the destination fiber span, each signal's modulation characteristics, and signal-to-noise ratio (SNR) bias preferences compared to neighboring signals. The channel routing information and the signal characteristics is required for the spectrum controller 50 to perform optimization. In addition to receiving the relevant data, the spectrum controller 50 can provide adjustments for changing parameters associated with the visible channels 120.

To support the non-visible channels 130, the systems and methods receive an external input for the channel routing information and the signal characteristics of each of the non-visible channels 130 and combine this data with the associated data for the visible channels 120 to provide the input 70 to the spectrum controller 50. That is, the systems and methods apply a software construct to make a set of externally applied optical signals, i.e., the non-visible channels 130, properly manageable by the spectrum controller 50. This external input is a logical mapping of the channel routing information and the signal characteristics of each of the non-visible channels 130 in any layer of software such as in local network element software, or in upper layer tools or micro-services. Specifically, an NMS, EMS, Planning tool, Software Defined Networking (SDN) application, control plane, etc. can include a user interface for mapping the associated non-visible channels 130 to the inputs 70. This external input for the non-visible channels 130 is combined with received data for the visible channels 120 to provide a single set of data for the inputs 70 to the spectrum controller 50. The spectrum controller 50 operates per normal configuration and could be unaware of the presence of the non-visible channels 130. The output 72 can provide adjustments, settings, parameter changes, etc. for the non-visible channels 130 which is manually acted upon. In this manner, the spectrum controller 50 can operate without having visibility of all the channels in the optical spectrum 62 and there is no need to turn the spectrum controller 50 off as before.

Figure 5:
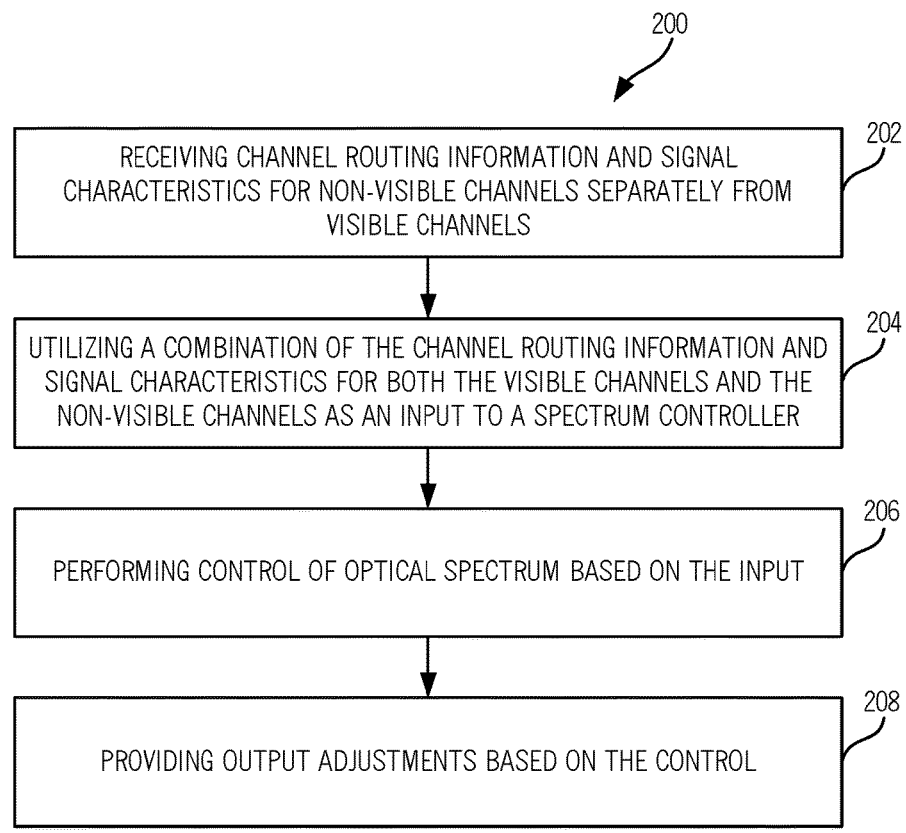
FIG. 5 is a flowchart of a spectrum controller process for controlling both visible channels and non-visible channels.

Referring to FIG. 5, in an exemplary embodiment, a flowchart illustrates a spectrum controller process 200 for controlling both visible channels and non-visible channels. The spectrum controller process 200 includes receiving channel routing information and signal characteristics for non-visible channels separately from visible channels (step 202). Specifically, the channel routing information and signal characteristics for the visible channels is typically received via vendor-specific communications techniques whereas the channel routing information and signal characteristics for the non-visible channels is received based on manual input, e.g., via a Graphical User Interface (GUI). The spectrum controller process 200 includes utilizing a combination of the channel routing information and signal characteristics for both the visible channels and the non-visible channels as an input to a spectrum controller (step 204), performing control of optical spectrum based on the input (step 206), and providing output adjustments based on the control (step 208).

The output adjustments can include i) output power adjustments of each of the one or more first optical transceivers and the one or more second optical transceivers, and ii) gain adjustments to one or more amplifiers. The output adjustments can be automatically implemented in the one or more first optical transceivers and provided as recommendations for manual implementation in the one or more second optical transceivers. The second optical transceivers can include one or more bulk channel sources for channel loading. The second optical transceivers can include one or more third-party optical transceivers which provide foreign channels supported in the optical network.

The channel routing information can include a source port at a channel access point and a destination degree; and the signal characteristics can include a plurality of control or center frequency, spectral shape, required bandwidth or spectral spacing compared to neighboring signals, total signal power or power spectral density at the source port, target launch power, modulation, and signal-to-noise ratio bias preferences compared to neighboring signals. The channel routing information and signal characteristics for the non-visible channels can be modeled as a virtual colorless multiplexer/demultiplexer with N ports, N being an integer greater than or equal to 1, and with associated insertion losses on each port to model multiplexing structure. The channel routing information and signal characteristics for the non-visible channels can be modeled as an array of logical source and sink mappings. The spectrum controller can operate on an optical section with the visible channels and the non-visible channels.

Techniques to Logically Map the Non-Visible Channels

The systems and methods can include two techniques to logically map an array of non-visible channels 130 onto a fiber for the inputs 70 to the spectrum controller. The array is a data structure of the channel routing information and signal characteristics. Each entry for a non-visible channel 130 can have different values, e.g., bandwidth, frequency spacing, optical power, etc. A first technique can include a virtual colorless multiplexer/demultiplexer N (vCCMDN) circuit pack with N number of add/drop ports. By virtual, the colorless multiplexer/demultiplexer circuit pack is modeled as a data structure for input to the spectrum controller 50. A second technique includes a logical cross-connect provisioning directly from the physical channel access ports of the OADM node.

Virtual Colorless Multiplexer/Demultiplexer

Figure 6:
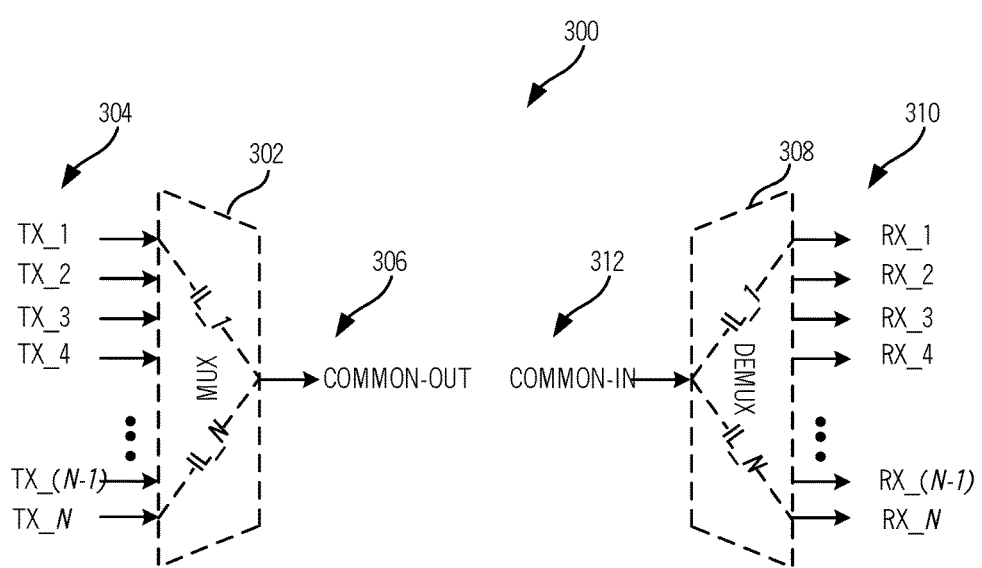
FIG. 6 is a diagram of a logical representation of a virtual colorless multiplexer/demultiplexer N (vCCMD)

Referring to FIG. 6, in an exemplary embodiment, a diagram illustrates a logical representation of a virtual colorless multiplexer/demultiplexer N 300 (vCCMD). Specifically, the virtual colorless multiplexer/demultiplexer N 300 is a logical representation of actual components in the optical network 10 to model the non-visible channels 130 in the spectrum controller. The virtual colorless multiplexer/demultiplexer N 300 is defined with N number of add or drop ports, N is an integer. Each add/drop port comes with a software facility to map transceiver (Tx/Rx) signal characteristics, including signal shapes, bandwidths, spectral location, typical power values, minimum and maximum operational power limits, launch power targets, required spectral spacing with neighbors, and the like. Further, the virtual colorless multiplexer/demultiplexer N 300 can include channel routing information as well.

At a channel access point for ingress, the virtual colorless multiplexer/demultiplexer N 300 includes a virtual multiplexer 302 with N input ports for up to N transmitters 304 which are combined to a common output port 306 which is what is modeled in the spectrum controller 50 as the inputs 70 for the non-visible channels 130. At a channel access point for egress, the virtual colorless multiplexer/demultiplexer N 300 includes a virtual demultiplexer 308 with N output ports for up to N receivers 310 which are split from a common input port 312 which is what is modeled in the spectrum controller 50 at the outputs 72 for the non-visible channels 130.

Each port also has a software facility to map the insertion loss (IL N) from the add/drop port to the common out/in port 306, 312. Since the virtual colorless multiplexer/demultiplexer N 300 circuit pack is virtual, the default value for the insertion loss can be set at 0.0 dB, while that can be modified for individual ports to accommodate any additional loss or gain values for a specific Tx or Rx port. Since all the ports are virtual, bandwidths and insertion loss and other signal characteristics for each port are completely independent of any other ports, and a single Tx/Rx port can accommodate a single signal of specific bandwidth or an array of closely spaced signals, for example, a multi-carrier super-channel.

Also, the value of N in the virtual colorless multiplexer/demultiplexer N 300 circuit can be manually adjusted to any integer value (i.e. N≥1) with a given maximum limit bounded by the memory allocation available in any processing system. For example, with N=128, the virtual circuit pack becomes vCCMD128 that is capable of mapping 128×Tx/Rx signals. Similarly, with N=384, the vCCMD384 can logically map 384×real-life Tx/Rx signals. Since the card is virtual and colorless, it can accommodate any signal from any spectral location, including C-, L-, S-, and E-bands.

Figure 7:
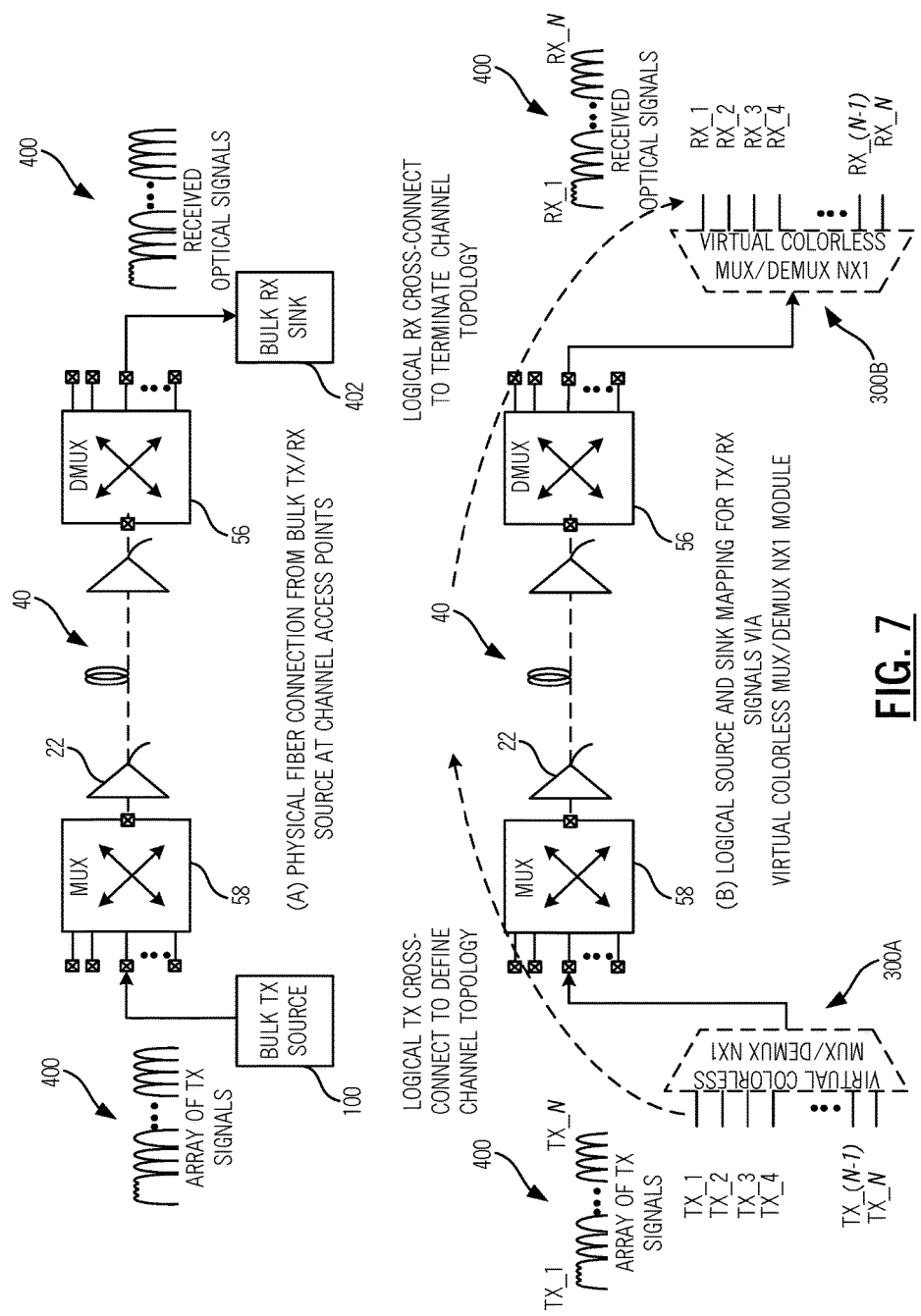
FIGS. 7(A) and 7(B) are network diagrams of an optical section with physical fiber connections (FIG. 7(A) and associated logical mappings via the virtual colorless multiplexer/demultiplexer N (FIG. 7(B))

Referring to FIGS. 7(A) and 7(B), in an exemplary embodiment, a network diagram illustrates an optical section 40 with physical fiber connections (FIG. 7(A) and associated logical mappings via the virtual colorless multiplexer/demultiplexer N 300 (FIG. 7(B)). In both FIGS. 7(A) and 7(B), the optical section 40 includes the multiplexer 58 with input ports, one or more amplifiers 22, and the demultiplexer 56 with output ports. The spectrum controller 40 is configured to operate on the optical section 40. FIG. 7(A) shows how the transmit (Tx) signals 400 from the bulk channel source 100 is directly connected to one of the channel access points (input ports) of the multiplexer 58. At the far end, the demultiplexer 56 drops the received signals 400 on a bulk channel sink 402 (e.g., on an array of coherent receivers, or to an optical spectral analyzer). Note, while FIG. 7(A) illustrates the bulk channel source 100, the input ports could also receive alien or foreign channels from third-party optical transceivers.

In FIG. 7(B), in order to make sure that all the spectrum controllers 50 know about the Tx/Rx signal characteristics to achieve their desired control, for application purposes, the bulk channel source 100 is modeled as a vCCMDN mux 100A, where each incoming Tx signal is mapped to a Tx facility port of the vCCMDN mux 100A virtual pack with user defined signal characteristics parameters (such as power, bandwidth, etc.) and channel routing information. The fiber loss (if any) from the Tx signal to the OADM access point (input ports) is also mapped as an insertion loss of the vCCMDN mux 100A for that Tx port to the common out point. Similarly, the signals that are dropping at the bulk channel sink 402 are also modeled as a vCCMDN demux 300B, where each dropped Rx signal is mapped to a Rx facility of the vCCMDN demux 300B virtual pack. Once the signals are logically mapped to the Tx/Rx facilities, a pair of logical cross-connect (one for Tx and one for Rx) is then provisioned from the virtual CCMD Tx/Rx ports to/from a specific degree-out port in order to layout channel topology, as well as, to advertise signal properties to all photonic controllers working towards that specific line fiber direction, for the channel routing information.

Of note, the virtual colorless multiplexer/demultiplexer N 300 is capable of modeling any arbitrary mux/demux structure with a single or combination of discrete components, by allowing provisioning of per path insertion loss or gain values both in transmit and receive direction.

Logical Cross-Connect Mapping

Figure 8:
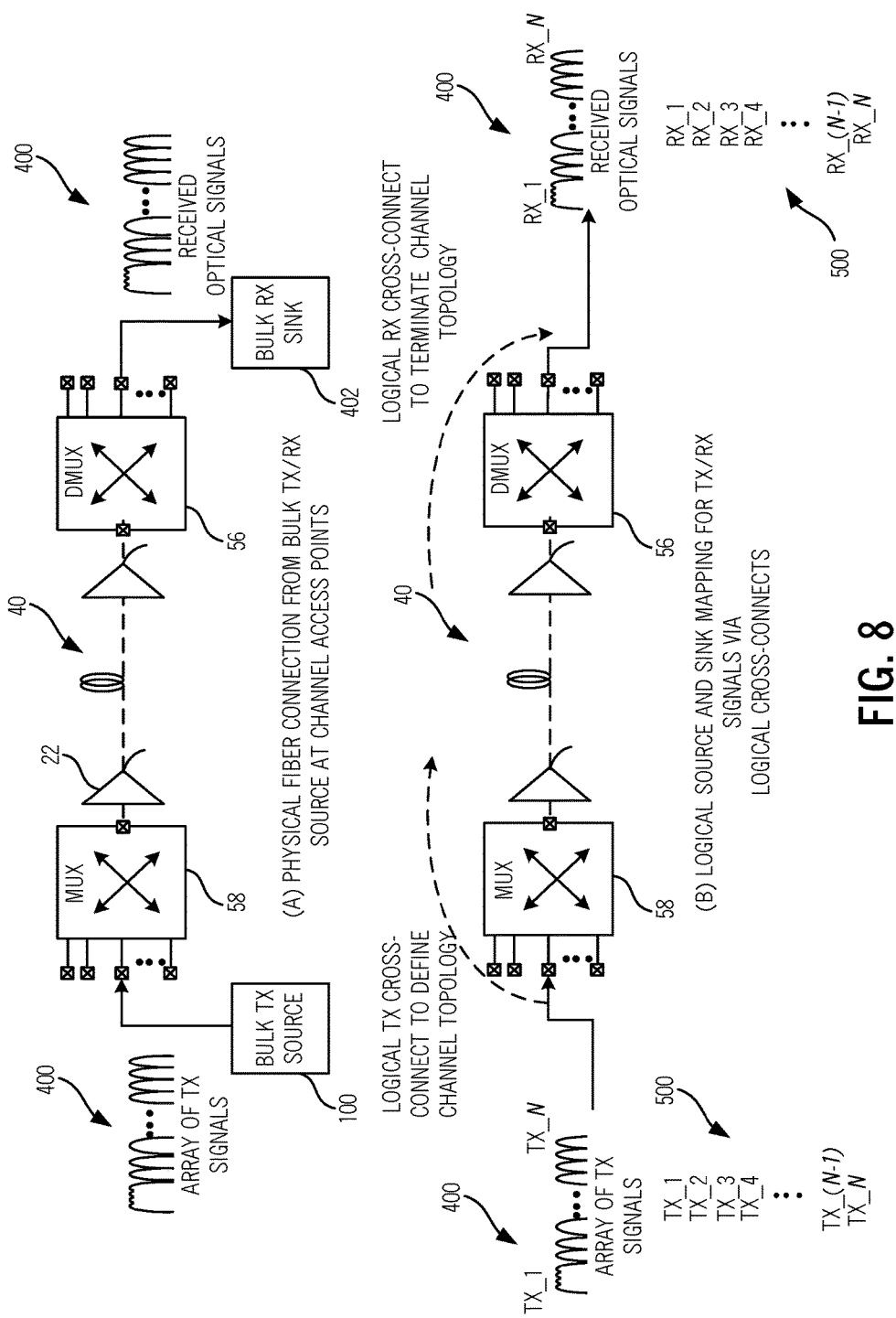
FIGS. 8(A) and 8(B) are network diagrams of an optical section with physical fiber connections (FIG. 8(A) and associated logical mappings via a logical source and sink mapping (FIG. 8(B))

Referring to FIGS. 8(A) and 8(B), in an exemplary embodiment, a network diagram illustrates an optical section 40 with physical fiber connections (FIG. 8(A) and associated logical mappings via a logical source and sink mapping 500 (FIG. 8(B)). In an exemplary embodiment, instead of using the virtual colorless multiplexer/demultiplexer N 300 equipment and facilities, it is also possible to create logical cross-connects directly from the physical channel access port of the OADM node, where the singled fiber carrying the array of optical signals is connected, towards a specific degree-out port, while all the Tx/Rx signal specific properties (such as signal bandwidth, power parameters, spectral location, etc.) can be embedded as additional application facilities of the logical cross-connect entity. The signal characteristics mapping for a specific Tx/Rx signal into a logical cross-connect facility is completely independent of any other signals, and a single logical cross-connect can map a single signal of specific bandwidth or an array of closely spaced signals, for example, a multi-carrier super-channel of much wider bandwidth. In this way, the array of optical signals coming onto a single fiber can also be logically mapped to control applications understandable parameters so that manual user interventions can be avoided.

Third-Party Optical Transceivers—Open Line System and "White Box"

The optical network 10 can be referred to as an open line system where any vendor's optical transceiver (referred to herein as third-party optical transceivers with foreign or alien channels) can work over the optical sections 40. With the systems and methods herein, the signal characteristics and channel routing information can be incorporated in the inputs 70, allowing the spectrum controller 50 the ability to work with these third-party optical transceivers in addition to the bulk optical sources 100.

In another exemplary embodiment, the optical network 10 can implement a so-called "white box" approach where completely different network elements from different vendors can interwork with one another. The "white box" approach does provide some degree of standardization, but this standardization does not extend to complex spectrum controllers 50. In such a configuration, the virtual colorless multiplexer/demultiplexer N 300 or the logical source and sink mapping 500 can be used to model channels at a ROADM allowing an existing spectrum controller 50 control thereof.

Exemplary Controller

Figure 9:
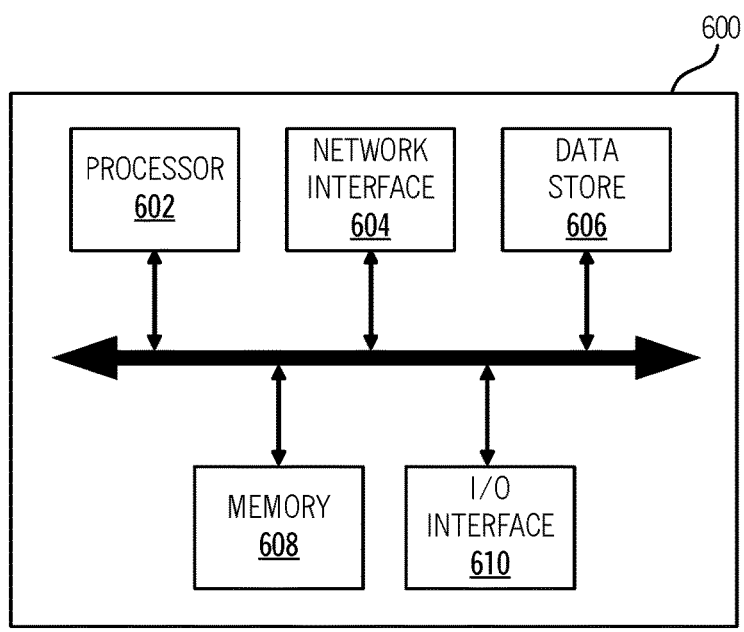
FIG. 9 is a block diagram of a controller to implement the spectrum controller, a management system, and/or operations, administration, maintenance, and provisioning (OAM&P) for a network element in the optical network.

Referring to FIG. 9, in an exemplary embodiment, a block diagram illustrates a controller 600 to implement the spectrum controller 50, a management system, and/or operations, administration, maintenance, and provisioning (OAM&P) for a network element in the optical network 10. The controller 600 can be part of common equipment at a network element, such as the ROADM 12, or a stand-alone device communicatively coupled to the network element. In a stand-alone configuration, the controller 600 can be an SDN controller, an NMS, an EMS, a planning tool, a Path Computation Element (PCE), etc. The controller 600 can include a processor 602 which is a hardware device for executing software instructions such as operating the control plane. The processor 602 can be any custom made or commercially available processor, a central processing unit (CPU), an auxiliary processor among several processors associated with the controller 600, a semiconductor-based microprocessor (in the form of a microchip or chip set), or generally any device for executing software instructions. When the controller 600 is in operation, the processor 602 is configured to execute software stored within the memory, to communicate data to and from the memory, and to generally control operations of the controller 600 pursuant to the software instructions. The controller 600 can also include a network interface 604, a data store 606, memory 608, an I/O interface 610, and the like, all of which are communicatively coupled to one another and to the processor 602.

The network interface 604 can be used to enable the controller 600 to communicate on the DCN 510, such as to communicate control plane information to other controllers, to the management system 508, to the nodes 402, and the like. The network interface 604 can include address, control, and/or data connections to enable appropriate communications on the network. The data store 606 can be used to store data, such as control plane information, provisioning data, OAM&P data, etc. The data store 606 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 606 can incorporate electronic, magnetic, optical, and/or other types of storage media. The memory 608 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 608 may incorporate electronic, magnetic, optical, and/or other types of storage media. Note that the memory 608 can have a distributed architecture, where various components are situated remotely from one another, but may be accessed by the processor 602. The I/O interface 610 includes components for the controller 600 to communicate with other devices. Further, the I/O interface 610 includes components for the controller 600 to communicate with the other nodes.

In an exemplary embodiment, the controller 600 is configured to implement the spectrum controller 50. To that end, the controller 600 is communicatively coupled to one or more network elements in the optical network 10, such as the ROADM nodes 12. The controller 600 can receive optical signal characteristics and channel routing information for the visible channels 120, specifically, channels formed by optical transceivers which are integrated communication-wise with the spectrum controller 50. The controller 600 can further receive, separately, optical signal characteristics and channel routing information for the non-visible channels 130, such as via a User Interface, API, etc.

In an exemplary embodiment, the controller 600 includes the processor 602; a communications interface (e.g., the network interface 604 and/or I/O interface 610) communicatively coupled to the processor 602; and memory 608 storing instructions that, when executed, cause the processor 602 to receive, via the communications interface, channel routing information and signal characteristics for the non-visible channels separately from visible channels, wherein the visible channels are formed by optical transceivers communicatively coupled to the spectrum controller and the non-visible channels are formed by optical transceivers without communication to the spectrum controller, utilize a combination of the channel routing information and signal characteristics for both the visible channels and the non-visible channels as input to the spectrum controller, perform control of optical spectrum based on the input, and provide output adjustments based on the control.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for modeling non-visible optical sources generating optical signals coming to the input of a spectrum controller in a single fiber for control thereof in an optical network, the method comprising:
receiving channel routing information and signal characteristics for the non-visible channels separately from visible channels, wherein the visible channels are formed by one or more first optical transceivers communicatively coupled to the spectrum controller and the non-visible channels are formed by one or more second optical transceivers without communication to the spectrum controller;
utilizing a combination of the channel routing information and signal characteristics for both the visible channels and the non-visible channels as input to the spectrum controller;

performing control of optical spectrum based on the input; and providing output adjustments based on the control, wherein, for the non-visible channels, fiber loss from an associated source of each of the non-visible channels is modeled as insertion loss into a virtual port for modeling the non-visible channels.

2. The method of claim 1, wherein the output adjustments comprise
   i) output power adjustments of each of the one or more first optical transceivers and the one or more second optical transceivers, and
   ii) gain adjustments to one or more amplifiers.

3. The method of claim 1, wherein the output adjustments are automatically implemented in the one or more first optical transceivers and provided as recommendations for manual implementation in the one or more second optical transceivers.

4. The method of claim 1, wherein the second optical transceivers comprise any of i) one or more bulk channel sources for channel loading and ii) one or more third-party optical transceivers which provide foreign channels supported in the optical network.

5. The method of claim 1, wherein the channel routing information comprises a source port at a channel access point and a destination degree; and
   wherein the signal characteristics comprise a plurality of control or center frequency, spectral shape, required bandwidth, spectral spacing compared to neighboring signals, total signal power or power spectral density at the source port, target launch power, modulation, and signal-to-noise ratio bias preferences compared to neighboring signals.

6. The method of claim 1, wherein the channel routing information and signal characteristics for the non-visible channels is modeled as a virtual colorless multiplexer/demultiplexer with N ports, N being an integer greater than or equal to 1, and with associated insertion losses on each port to model multiplexing/demultiplexing structure, wherein each port can model any signal from any spectral location.

7. The method of claim 1, wherein the channel routing information and signal characteristics for the non-visible channels is modeled as an array of logical source and sink mappings.

8. The method of claim 1, wherein, for the non-visible channels, the signal characteristics for one port are independent of the signal characteristics of another port.

9. The method of claim 1, wherein each of the non-visible channels is mapped as a logical cross-connect facility independent of other of the non-visible channels.

10. The method of claim 1, wherein the spectrum controller operates on an optical section with the visible channels and the non-visible channels.

11. A spectrum controller adapted to model non-visible optical sources for control thereof in an optical network, the spectrum controller comprising:
    a processor;
    a communications interface communicatively coupled to the processor; and
    memory storing instructions that, when executed, cause the processor to
       receive, via the communications interface, channel routing information and signal characteristics for the non-visible channels separately from visible channels, wherein the visible channels are formed by optical transceivers communicatively coupled to the spectrum controller and the non-visible channels are formed by optical transceivers without communication to the spectrum controller,
       utilize a combination of the channel routing information and signal characteristics for both the visible channels and the non-visible channels as input to the spectrum controller,
       perform control of optical spectrum based on the input, and
       provide output adjustments based on the control,
       wherein, for the non-visible channels, fiber loss from an associated source of each of the non-visible channels is modeled as insertion loss into a virtual port for modeling the non-visible channels.

12. The spectrum controller of claim 11, wherein the output adjustments comprise
    i) output power adjustments of each of the one or more first optical transceivers and the one or more second optical transceivers, and
    ii) gain adjustments to one or more amplifiers.

13. The spectrum controller of claim 11, wherein the output adjustments are automatically implemented in the one or more first optical transceivers and provided as recommendations for manual implementation in the one or more second optical transceivers.

14. The spectrum controller of claim 11, wherein the second optical transceivers comprise any of i) one or more bulk channel sources for channel loading and ii) one or more third-party optical transceivers which provide foreign channels supported in the optical network.

15. The spectrum controller of claim 11, wherein the channel routing information comprises a source port at a channel access point and a destination degree; and
    wherein the signal characteristics comprise a plurality of control or center frequency, spectral shape, required bandwidth or spectral spacing compared to neighboring signals, total signal power or power spectral density at the source port, target launch power, modulation, and signal-to-noise ratio bias preferences compared to neighboring signals.

16. The spectrum controller of claim 11, wherein the channel routing information and signal characteristics for the non-visible channels is modeled as a virtual colorless multiplexer/demultiplexer with N ports, N being an integer greater than or equal to 1, and with associated insertion losses on each port to model multiplexing structure.

17. The spectrum controller of claim 11, wherein the channel routing information and signal characteristics for the non-visible channels is modeled as an array of logical source and sink mappings.

18. The spectrum controller of claim 11, wherein, for the non-visible channels the signal characteristics for one port are independent of the signal characteristics of another port, and fiber loss from an associated source of each of the non-visible channels is modeled as insertion loss into a virtual port for modeling the non-visible channels.

19. A method for modeling non-visible optical sources generating optical signals coming to the input of a spectrum controller in a single fiber for control thereof in an optical network, the method comprising:
    receiving channel routing information and signal characteristics for the non-visible channels separately from visible channels, wherein the visible channels are formed by one or more first optical transceivers communicatively coupled to the spectrum controller and the non-visible channels are formed by one or more second optical transceivers without communication to the spectrum controller;

utilizing a combination of the channel routing information and signal characteristics for both the visible channels and the non-visible channels as input to the spectrum controller;

performing control of optical spectrum based on the input; and providing output adjustments based on the control, wherein the channel routing information and signal characteristics for the non-visible channels is modeled as a virtual colorless multiplexer/demultiplexer with N ports, N being an integer greater than or equal to 1, and with associated insertion losses on each port to model multiplexing/demultiplexing structure, wherein each port can model any signal from any spectral location.

20. The method of claim 10, wherein the output adjustments comprise i) output power adjustments of each of the one or more first optical transceivers and the one or more second optical transceivers, and ii) gain adjustments to one or more amplifiers.

* * * * *